Dec. 6, 1960

E. H. COOKE-YARBOROUGH 2,963,223

MULTIPLE INPUT BINARY ADDER EMPLOYING MAGNETIC DRUM DIGITAL COMPUTING APPARATUS

Filed Nov. 17, 1954

Inventor
EDMUND HARRY COOKE-YARBOROUGH,

By Robert B Larson

Attorney

United States Patent Office 2,963,223

Patented Dec. 6, 1960

2,963,223

MULTIPLE INPUT BINARY ADDER EMPLOYING MAGNETIC DRUM DIGITAL COMPUTING APPARATUS

Edmund Harry Cooke-Yarborough, Longworth, near Abingdon, England, assignor, by mesne assignments, to the United States of America as represented by the United States Atomic Energy Commission Filed Nov. 17, 1954, Ser. No. 469,513

2 Claims. (Cl. 235—176)

Figures 1, 2:
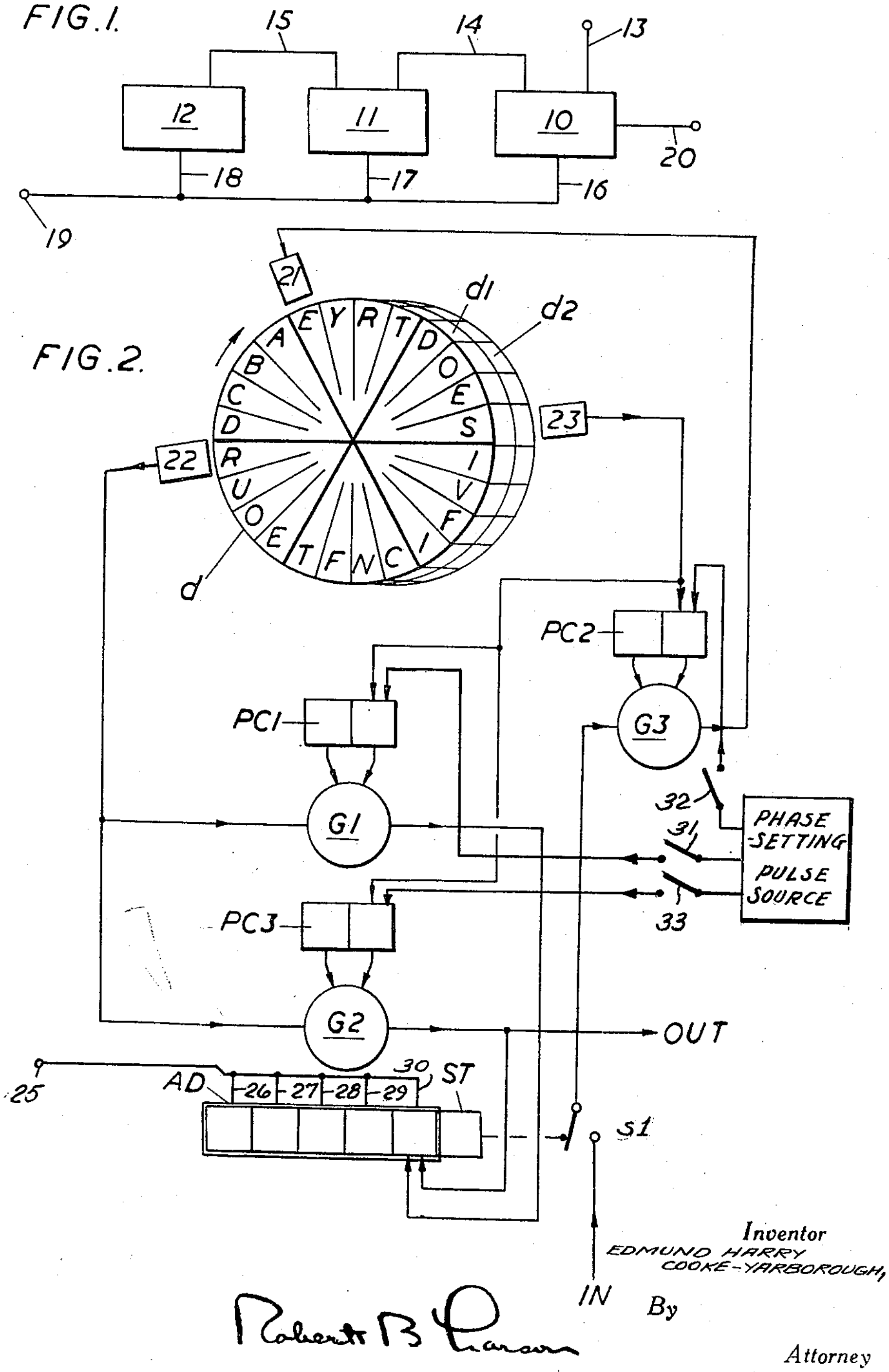

This invention relates to digital computing apparatus.

The invention provides computing apparatus having means for storing multi-digit numbers in an interlaced manner so that the consecutive digits of a number when stored occupy a corresponding minor time interval in consecutive regularly recurring major time intervals and the digits associated with any one major time interval all have the same significance.

The invention is further described by considering, by way of example, the storage of four six digit numbers represented by the words: ARTIST; BUFFER; CONVOY; DECIDE.

In accordance with the invention these numbers are stored in time of spatial relationship as follows: ABCD; RUOE; TFNC; IFVI; SEOD; TRYE.

The intervals between the digits A—R—T—I—S—T or between the digits B—U—F—F—E—R etc. are regular and are referred to as major clock periods. Each of these periods is divided into minor clock periods represented by the intervals between digits A—B—C—D or R—U—O—E etc.

It is seen that each major clock period consists of digits of the same significance, for example, the period beginning just before A and finishing just before R consists of digits of the highest significance.

It follows, from the description given above, that a number may be read from store by opening a gate for a minor clock period at the same time delay from the start of each major clock period; i.e. at a preselected phasing of opening the gates for minor clock periods. Similarly two or more numbers may be read from store by opening two or more respective gates each during differently phased minor clock periods.

Accordingly, digital computing apparatus of the invention comprises a store, means for reading out numbers from discrete locations in said store in a predetermined recurring order at regularly spaced time intervals, means for storing multi-digit numbers therein in an interlaced manner so that the consecutive digits of each number are read out a selected major time interval apart while the digits of the same significance in all numbers are read out consecutively, a plurality of gate means connected to said reading out means, means to open said gates at recurring timed intervals, and means to change the order of opening said gates by phase preselection.

The phase selection of numbers from the store permits numbers to be extracted almost simultaneously and to be added digit by digit and recorded at the same time in another store or a vacant part of the same store. For example, the numbers ARTIST and BUFFER above could be added to give, say, the sum CONVOY in the time interval of six major clock pulses without the need for intermediate storage facilities.

The computer of the invention may well be compared with known forms of computers wherein addition of numbers occurs by first with-drawing a number from a store and recording it in another store and then adding thereto a further number withdrawn from the store. Not only is there a time saving with the computer of the invention but also storage capacity reduction over known forms of computers.

In one form of the invention an ancillary register circuit is provided which is adaptable for phase setting or for the adding of digits. The register comprises a string of similar circuit elements, an input connection to the first element of the string, carry circuits between consecutive elements of the string, shift circuits to all the elements of the string, means for applying shift pulses to the shift circuits at a fixed point in each major clock period and an output circuit from said first element.

This form adapted to the binary numerical system, is now described with reference to the accompanying drawing in which:

Fig. 1 is a block diagram of an ancillary register circuit and Fig. 2 is a similar diagram showing a number of such registers combined with a magnetic storage drum to constitute a computing apparatus.

In Fig. 1 the register consists of a string of bistable circuit elements 10, 11, 12 provided with an input connection 13 to the element 10, carry circuits 14, 15 between elements 10 and 11 and 11 and 12 respectively, shift circuits 16, 17, 18; a connection 19 for applying shift pulses and an output circuit 20.

A pulse signal applied at the input 13 is arranged to change the state of element 10 from a state representing the digit 0 to its other state representing the digit 1.

Being a binary system register the next pulse causes a reversal to state 0 and provides a carry pulse over circuit 14 to element 11 which then changes from state 0 to state 1 and so on along the register.

In the particular three-circuit arrangement shown in Fig. 1 the configuration repeats at each eighth input pulse, for being a binary system with a maximum of three digits provided by the three circuits the only numbers that can be recorded 000, 001, 010, 011, 100, 101, 110 and 111 the next pulse reverting the configuration to 000. A two-circuit arrangement would be capable of recording four different numbers viz. 00, 01, 10 and 11 before reverting to 00.

The shift circuits 16, 17 and 18 are arranged to shift the number represented by the register one place to the right, i.e in Fig. 1 to pass to the output 20 the digit (0 or 1) which was represented by the state of element 10, to change if necessary the state of element 10 to the state of element 11 and the state of element 11 to that of element 12.

Suitable bistable elements, carry circuits and shift circuits for constructing such a register are well known in the art. See, for example, High-Speed Computing Devices, E.R.A. Staff, McGraw-Hill Book Company, pp. 14, 18, 299.

Referring now to Fig. 2, a magnetic storage drum *d* is shown as having two tracks *d*1 and *d*2. The drum is a very simple example adapted to store four six digit numbers and has six major circumferential divisions as indicated by the heavy radial lines and four minor divisions in each major division. Storage is effected on track $d1$ by means of a magnetic writing head 21 and the number stored is read off for example, almost five major periods (noting the clockwise direction of rotation of the drum) of time later by a magnetic reading head 22. Track $d2$ provides a continuous series of minor clock pulses, i.e. one pulse each time one minor division of the drum rotates past a reading head 23.

These minor clock pulses are fed to each of three two digit binary registers PC1, PC2 and PC3 each capable of four different states, i.e. 00, 01, 10 and 11. The registers control gates G1, G3 and G2 respectively such that each gate is open only for one particular state of its associated register.

The registers PC1, PC2 and PC3 are similar to the register described with reference to Fig. 1, except that they are two-element instead of three-element registers and that no shift circuits (16, 17 and 18) are provided. The dual input gates may be of the conventional type. See the above-cited book, p. 37, for example. The gates will be open for only one of the four states of the respective registers. Sensing leads from each element of the two element registers form the control inputs to the gates in the conventional manner.

The output from the reading head 22 is fed through gates G1 and G2 to the input (corresponding to input 13 of Fig. 1) of a further register AD which is the adding register. The provision of two registers PC1 and PC3 enables two numbers to be selected from the drum $d$ and added in the register AD. Any further number of such registers could, however, be provided up to the limit of the storage capacity of the drum, which in this simple example is four, to enable four numbers to be added together in our operation.

By the very nature of binary numbers, the adding register AD requires two elements for adding two numbers irrespective of the number of digits in each number. To add four numbers, three elements are required. Five elements happen to be shown. The output of the adding register (corresponding to output 20 of Fig. 1) is fed to a storing element ST, which is a bi-stable element similar to the other elements of the register, before being fed through switch S1 and gate G3 to the writing head 21. An alternative position of the switch enables a pulse train representing a binary number to be fed from an outside source IN directly to the gate G3 and hence to the writing head 21. An output pulse train may also be taken from the output of gate G2 as shown. The time sequence of the pulses is always in ascending order of significance.

The adding register AD is provided with shift circuits 26, 27, 28, 29, and 30 but (similar to the circuits 16, 17 and 18 of Fig. 1) which are operated from a common input 25 (similar to input 19 of Fig. 1) once every major clock period i.e. every four minor clock periods. These major clock pulses may be derived by frequency division of the output of the reading head 23 or from another head associated with a further track marked with major clock pulses.

In the operation of the computer, the switch S1 is moved to the position connecting the input IN to the gate G3 and a pulse train representing a binary number of not more than six digits is fed in at the input. The drum $d1$ is rotated at substantially constant speed and the input pulses are synchronised with the gate G3. The gate G3 is opened by the register PC2 at every fourth minor clock pulse and hence the input pulses are each caused to mark the drum in a particular minor period or phase of successive major clock periods. The particular minor period or phase in which the marking or storage takes place depends on the phasing of the register PC2 with respect to the drum $d$. For example, if the register PC2 is in the condition which opens gate G3 when the drum is in the position shown the number will be stored in the last minor period or phase of each major period as indicated by the word DECIDE. It will be noticed that the letters indicated on the drum represent the words ARTIST, BUFFER, CONVOY and DECIDE interlaced in the manner above described.

By altering the phasing of the register PC2, as by injecting a pulse or pulses from a further source 24 additional to the minor clock pulse track, so that the state of the register at the beginning of the writing cycle is changed, another number such as that represented by the word BUFFER, can be stored on the drum in a selected one of the three remaining minor periods.

Having stored two numbers they may be removed from store, added in register AD and returned to store as follows:

The switch S1 is moved to the position shown and the registers PC1, and PC3 are adjusted (by injecting phase-setting pulses as in the manner already described in connection with the operation of register PC2) to correspond in phase to the phasing of the numbers represented by the words DECIDE and BUFFER respectively which is assumed have been stored. To adjust the registers PC1, PC2, and PC3, the proper number of phase setting pulses from source 24 are supplied to each register separately by closing one of the switches 31, 32, 33 at a time. Assume that the minor cycles are denoted 1st, 2nd, 3rd, and 4th. A, B, C, D are then read out in order during the respective minor cycles. Register PC1 is set to open G1 during the 4th minor cycle, and PC3 is set to open G2 during the 2nd minor cycle. The register AD is cleared to contain all 0's before addition is started, by pulsing lead 25 to change all the stages to 0. The gate G1 then passes pulses representing the word DECIDE and the gate G2 passes pulses representing the word BUFFER. The two words are interlaced when fed to the input of the adding register so that in the first major period the letters D and B (representing the digits of lowest significance) are fed to the input and are added. Before the next two letters E and U arrive a shift pulse is applied to the register shifting the sum of the letters D and B one place to the right so that the sum digit of lowest significance appears in the storing element ST. The next two letters E and U are then added and the sum again shifted and this time the sum digit of lowest significance in store ST is fed out through gate G3 to head 21. The phase of gate G3 is adjusted before addition starts, by pulses from source 24 to PC2, so that each digit is recorded on the drum in an empty phase. This sum can then be read off by the head 22 and fed out as a pulse train by adjusting the phase of register PC3 to correspond to that of the sum after addition is complete.

The process of adding each pair of digits of the same significance at a time and then shifting the register to get successive digits of the sum is best illustrated by the following table using binary notation for the digits and referring to the circuit of Fig. 1. Those digits indicated as passed to store via output 20 are, in the arrangement of Fig. 2, held in storing element ST for one major clock period before being fed to the storage drum.

Assume that the binary numbers 010111 and 001111 are to be added in the register of Fig. 1.

The function of adding two six digit binary numbers is now illustrated by the following table. The numbers selected are 010111 and 001111, and are assumed to be stored where BUFFER and CONVOY are indicated. Further assume that AD is cleared to contain all zeros, and that the gate control registers all are adapted to open their respective gates upon reaching the state 11. PC1 is initially set to state 00, PC2 is set to state 11, and PC3 is set to 01. Gate G1 then opens each fourth minor cycle, G3 opens each first minor cycle, and G2 opens each second minor cycle.

*Table 1*

| Time | | Act | States of Registers | | | Track *dl* | States of Registers | | |
|---|---|---|---|---|---|---|---|---|---|
| Major | Minor | | Ckt. 11 | Ckt. 10 | ST | | PC2 | PC1 | PC3 |
| Initial | | Phase Setting | 0 | 0 | 0 | ------ | 11 | 00 | 01 |
| 1 | 1 | ------ | 0 | 0 | 0 | ------ | 00 | 01 | 10 |
| | 2 | Read digit of least significance of BUFFER (B) via G2 | 0 | 1 | 0 | ------ | 01 | 10 | 11 |
| | 3 | Read digit of least significance of CONVOY (C) via G1 | 1 | 0 | 0 | ------ | 10 | 11 | 00 |
| | 4 | ------ | 1 | 0 | 0 | ------ | 11 | 00 | 01 |
| 2 | 1 | Shift | 0 | 1 | 0 | ------ | 00 | 01 | 10 |
| | 2 | Read digit of next significance (U) | 1 | 0 | 0 | ------ | 01 | 10 | 11 |
| | 3 | Read digit of next significance (O) | 1 | 1 | 0 | ------ | 10 | 11 | 00 |
| | 4 | Record | 1 | 1 | 0 | 0 (D) | 11 | 00 | 01 |
| 3 | 1 | Shift | 0 | 1 | 1 | ------ | 00 | 01 | 10 |
| | 2 | Read digit of next significance (F) | 1 | 0 | 1 | ------ | 01 | 10 | 11 |
| | 3 | Read digit of next significance (N) | 1 | 1 | 1 | ------ | 10 | 11 | 00 |
| | 4 | Record | 1 | 1 | 1 | 1 (E) | 11 | 00 | 01 |
| 4 | 1 | Shift | 0 | 1 | 1 | ------ | 00 | 01 | 10 |
| | 2 | Read digit of next significance (F) | 0 | 1 | 1 | ------ | 01 | 10 | 11 |
| | 3 | Read digit of next significance (V) | 1 | 0 | 1 | ------ | 10 | 11 | 00 |
| | 4 | Record | 1 | 0 | 1 | 1 (C) | 11 | 00 | 01 |
| 5 | 1 | Shift | 0 | 1 | 0 | ------ | 00 | 01 | 10 |
| | 2 | Read digit of next significance (E) | 1 | 0 | 0 | ------ | 01 | 10 | 11 |
| | 3 | Read digit of next significance (O) | 1 | 0 | 0 | ------ | 10 | 11 | 00 |
| | 4 | Record | 1 | 0 | 0 | 0 (I) | 11 | 00 | 01 |
| 6 | 1 | Shift | 0 | 1 | 0 | ------ | 00 | 01 | 10 |
| | 2 | Read digit of next significance (R) | 0 | 1 | 0 | ------ | 01 | 10 | 11 |
| | 3 | Read digit of next significance (Y) | 0 | 1 | 0 | ------ | 10 | 11 | 00 |
| | 4 | Record | 0 | 1 | 0 | 0 (D) | 11 | 00 | 01 |
| 7 | 1 | Shift | 0 | 0 | 1 | ------ | 00 | 01 | 10 |
| | 2 | ------ | 0 | 0 | 1 | ------ | 01 | 10 | 11 |
| | 3 | ------ | 0 | 0 | 1 | ------ | 10 | 11 | 00 |
| | 4 | Record | 0 | 0 | 1 | 1 (E) | 11 | 00 | 01 |

Giving an answer of 100110.

By providing a three element register up to four numbers having any number of digits can be added in a binary system. For example, to add 111, 011 and 010 the following process takes place. In the following Table 2, "PC4" refers to a fourth gate control register (not shown) having an associated gate and connected similarly to PC1 and PC3 to enable addition of three numbers.

*Table 2*

| Time | | Act | States of Registers | | | | Track *dl* | States of Registers | | | |
|---|---|---|---|---|---|---|---|---|---|---|---|
| Major | Minor | | Ckt. 12 | Ckt. 11 | Ckt. 10 | ST | | PC2 | PC1 | PC3 | PC4 |
| Initial | | Phase setting | 0 | 0 | 0 | 0 | ------ | 10 | 10 | 01 | 00 |
| 1 | 1 | Read least significant digit (A) via G1 | 0 | 0 | 1 | 0 | ------ | 11 | 11 | 10 | 01 |
| | 2 | Read least significant digit (B) via G2 | 0 | 1 | 0 | 0 | ------ | 00 | 00 | 11 | 10 |
| | 3 | Read least significant digit (C) via G4 | 0 | 1 | 0 | 0 | ------ | 01 | 01 | 00 | 11 |
| | 4 | Shift | 0 | 0 | 1 | 0 | ------ | 10 | 10 | 01 | 00 |
| 2 | 1 | Record ST and read second digit (R) | 0 | 1 | 0 | 0 | 0 (E) | 11 | 11 | 10 | 01 |
| | 2 | Read second digit (U) | 0 | 1 | 1 | 0 | ------ | 00 | 00 | 11 | 10 |
| | 3 | Read second digit (O) | 1 | 0 | 0 | 0 | ------ | 01 | 01 | 00 | 11 |
| | 4 | Shift | 0 | 1 | 0 | 0 | ------ | 10 | 10 | 01 | 00 |
| 3 | 1 | Record ST and read third digit (T) | 0 | 1 | 1 | 0 | 0 (D) | 11 | 11 | 10 | 01 |
| | 2 | Read third digit (F) | 0 | 1 | 1 | 0 | ------ | 00 | 00 | 11 | 10 |
| | 3 | Read third digit (N) | 0 | 1 | 1 | 0 | ------ | 01 | 01 | 00 | 11 |
| | 4 | Shift | 0 | 0 | 1 | 1 | ------ | 10 | 10 | 01 | 00 |
| 4 | 1 | Record ST | 0 | 0 | 1 | 1 | 1 (E) | 11 | 11 | 10 | 01 |
| | 2 | ------ | 0 | 0 | 1 | 1 | ------ | 00 | 00 | 11 | 10 |
| | 3 | ------ | 0 | 0 | 1 | 1 | ------ | 01 | 01 | 00 | 11 |
| | 4 | Shift | 0 | 0 | 0 | 1 | ------ | 10 | 10 | 01 | 00 |
| 5 | 1 | Record ST | 0 | 0 | 0 | 1 | 1 (C) | 11 | 11 | 10 | 01 |

I Claim:

1. Digital computing apparatus for adding a plurality of multi-digit binary numbers comprising: a digit store including a moving record member provided with only a single number storage track; means to derive a train of timing signals in synchronism with movement of said member; a single recording device and a single store reading member disposed in fixed spatial relationship to said storage track; means for receiving at said recording device a train of signals representing, in order, discrete groups of digits of said numbers, each group consisting of digits of the same significance in the respective numbers; a multistage serial adding register provided with means for shifting digits one stage lower; a bistable element coupled to the lowest-ordered stage of said adding register to receive a sum digit therefrom upon each shift; a plurality of gate circuits having an input lead, an output lead, and a plurality of gate control leads; a plurality of gate control multistage registers, each of said multistage registers being associated with a corresponding gate; means to apply said timing signal train to all said multistage registers to step the same cyclically through all positions, means coupling each of said multistage registers to said control leads of a corresponding gate to open said gate at only one selected position in each cycle; means coupling the input lead of a first of said gates to said bistable element to receive said sum digit, means coupling the output lead of said first gate to said recording device; means coupling the input leads of the remainder of said gates to said store-reading member to receive digits to be added, means coupling the output leads of said remainder of said gates to said adding register; and a phase-setting pulse source connectible to each of said multistage registers individually to step the same to different initial positions in said cycle.

2. In a computer provided with a rotating magnetic drum, a recording head, first and second reading heads disposed adjacent first and second recording tracks, and a series of timing signals recorded on said first track, means for adding binary numbers of $n$ digits each, where $n$ is a number greater than 1 comprising: means to deliver to said recording head at time intervals corresponding to said timing signals, a series of $n$ groups of digit-representing signals, each group consisting of digits of the same significance in said numbers, to record said pulse train on said second track on said drum in synchronism with said timing signals on said first track; a multistage serial adding register provided with shifting means; a bistable element coupled to said adding register to receive a sum digit therefrom upon each operation of said shifting means; a plurality of gate circuits having an input lead, an output lead, and a plurality of gate control leads, a plurality of gate control multistage registers, each of said multistage registers being associated with a corresponding gate; means to apply said timing signal train to all said multistage registers to step the same cyclically through all positions, means coupling each of said multistage registers to said control leads of a corresponding gate to open said gate at only one selected position in each cycle; means coupling the input lead of a first of said gates to said bistable element to receive said sum digit, means coupling the output lead of said first gate to said recording device, means coupling the input leads of the remainder of said gates to said second reading head to receive digits to be added, means coupling the output leads of said remainder of said gates to said adding register; and a phase-setting pulse source connectible to each of said multistage registers individually to step the same to different initial positions in said cycle, means to actuate said shifting means each $n$ time intervals to shift a sum digit to said bistable element, said multistage register coupled to said first gate being set by said pulse source to that position in its cycle $n$ steps before opening said first gate, whereby said first gate opens in synchronism with each of said shifts to pass said sum digit to said recording head.

References Cited in the file of this patent

UNITED STATES PATENTS

| | | |
|---|---|---|
| 2,564,403 | May | Aug. 14, 1951 |
| 2,594,731 | Connolly | Apr. 29, 1952 |
| 2,596,741 | Tyler et al. | May 13, 1952 |
| 2,609,143 | Stibitz | Sept. 2, 1952 |
| 2,652,554 | Williams et al. | Sept. 15, 1953 |
| 2,680,239 | Daniels et al. | June 1, 1954 |
| 2,723,080 | Curtis | Nov. 8, 1955 |
| 2,737,342 | Nelson | Mar. 6, 1956 |
| 2,770,797 | Hamilton et al. | Nov. 13, 1956 |

FOREIGN PATENTS

| | | |
|---|---|---|
| 507,259 | Belgium | Dec. 15, 1951 |
| 703,593 | Great Britain | Feb. 3, 1954 |
| 731,140 | Great Britain | June 1, 1955 |